(12) United States Patent
Baek et al.

(10) Patent No.: US 7,248,429 B2
(45) Date of Patent: Jul. 24, 2007

(54) ADAPTIVE SETTLING CONTROL METHOD AND APPARATUS IN TRACK SEEK MODE OF DISC DRIVE

(75) Inventors: Sang-eun Baek, Incheon-si (KR); Jun-seok Shim, Seongnam-si (KR); Chang-ik Kang, Jeju-si (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 0 days.

(21) Appl. No.: 11/290,418

(22) Filed: Dec. 1, 2005

(65) Prior Publication Data

US 2006/0114600 A1 Jun. 1, 2006

(30) Foreign Application Priority Data

Dec. 1, 2004 (KR) .................. 10-2004-0099739

(51) Int. Cl.
*G11B 5/596* (2006.01)
*G11B 5/55* (2006.01)
*G11B 21/02* (2006.01)

(52) U.S. Cl. ............... 360/78.09; 360/77.06; 360/78.06

(58) Field of Classification Search .............. 360/78.09
See application file for complete search history.

(56) References Cited

U.S. PATENT DOCUMENTS

| 4,697,127 A | * | 9/1987 | Stich et al. ............... 318/561 |
| 5,459,624 A | * | 10/1995 | Erickson et al. ......... 360/77.02 |
| 5,561,568 A | * | 10/1996 | Kisaka .................... 360/78.04 |
| 6,046,878 A | * | 4/2000 | Liu et al. .................... 360/75 |

* cited by examiner

*Primary Examiner*—Andrea Wellington
*Assistant Examiner*—Jason Olson
(74) *Attorney, Agent, or Firm*—Sughrue Mion, PLLC (57) ABSTRACT

A settling control method and apparatus perform an improved settling control regardless of a seek distance when a disc drive track seek control operation is performed. An adaptive settling control method used in controlling the track seek mode of the disc drive includes: controlling a head to converge into a target position and a target velocity along with an eigen vector by transiting an initial state of the head motion onto an eigen vector line of a system at the time transiting from an acceleration/deceleration control mode of the track seek mode to a settling control mode.

9 Claims, 6 Drawing Sheets

ADAPTIVE SETTLING CONTROL METHOD AND APPARATUS IN TRACK SEEK MODE OF DISC DRIVE

CROSS-REFERENCE TO RELATED PATENT APPLICATION

This application claims the benefit of Korean Patent Application No. 10-2004-0099739, filed on Dec. 1, 2004, in the Korean Intellectual Property Office, the disclosure of which is incorporated herein in its entirety by reference.

1. Field of the Invention

Apparatuses and methods consistent with the present invention relate to the control of disc drive servos, and more particularly, to settling control methods and apparatuses for performing an improved settling control regardless of a seek distance when a track seek control of a disc drive is performed.

2. Description of the Related Art

Disc drive servo control technologies related to the apparatuses and methods described here are disclosed in U.S. Pat. Nos. 5,072,318 and 6,636,376.

Commonly, a hard disc drive (HDD), a type of data storage device, reproduces data recorded on a disc or write data on a disc using a magnetic head. According to the trend for making high capacity, high density, and compact HDDs, the number of bits per inch (BPI), which denotes the recording density in a disc rotating direction, and the number of tracks per inch (TPI), which denotes the recording density in a disc diameter direction, has been increased. Accordingly, a more elaborate operation mechanism is required for HDDs.

When information is recorded on or read from a disc, an HDD performs a seek routine for moving a head from one track to another. During the seek routine, a voice coil motor (VCM) is excited by a current for moving the head to a new track position on the disc surface. A controller performs a servo routine for guaranteeing that the head moves to a correct cylinder position and to the center of a track.

It is generally desirable to minimize the amount of time required for reading information from or writing information on disc(s). Therefore, the seek routine performed by the HDD should move the head to a target track position within the shortest amount of time. In addition, the stabilizing time of a head gimbal assembly (HGA) should be minimized in order for the head to quickly write or read information and be located adjacently to a target track at once.

This track seek mode includes an acceleration/deceleration control mode and a settling control mode. The acceleration/deceleration control mode is a mode for quickly moving the head to a position adjacent to the target track, and the settling control mode is a mode for moving the head to the center of the target track after the acceleration/deceleration control mode.

In general, a nonlinear controller such as an optimal time controller is used in the acceleration/deceleration control mode, and a linear controller is used in the settling control mode. A response characteristic in the settling control mode is determined by an initial state of the head motion at the beginning of the settling control mode. For example, when an initial velocity is fast, the seek time may be increased due to generation of an overshoot. On the contrary, when the initial velocity is too slow, overshoot is not generated, but instead the response is slow. In actuality, the initial state in which the settling control mode begins depends on the track seek distance.

Since a settling control performance varies according to the track seek distance, a track seek servo performance is degraded, and in particular, a track seek time is longer than necessary.

SUMMARY OF THE INVENTION

Apparatuses and methods consistent with the present invention provide adaptive settling control in a disc drive track seek mode for maintaining an even settling control performance even if an initial state of the head motion varies at the beginning of the settling control mode in the track seek mode.

According to an aspect of the present invention, there is provided an adaptive settling control method in a track seek mode of a disc drive in a method of controlling the track seek mode of the disc drive. The method includes controlling a head to converge into a target position and a target velocity along with an eigen vector. The method operates by transiting an initial state of the head motion onto an eigen vector line of a system at the time transited from an acceleration/deceleration control mode of the track seek mode to a settling control mode.

According to another aspect of the present invention, there is provided an adaptive settling control apparatus in a track seek mode of a disc drive in a track seek control apparatus of the disc drive. The apparatus includes a state estimator estimating a state information value of head motion that includes head position, velocity, and control input information from a position error signal. The apparatus also includes a state feedback controller generating state feedback control information obtained by multiplying the state information value by a predetermined state feedback gain. The apparatus further includes a single mode control circuit generating initial state compensation information obtained by multiplying a state information initial value at the beginning of a settling control mode by a predetermined square matrix for transiting an initial state of head motion at the settling control mode beginning time of the track seek mode onto a system eigen vector line. A summing unit adds the initial state compensation information to a negative value of the state feedback control information. And a voice coil motor (VCM) driver & actuator moves a head by generating a driving current corresponding to an output of the summing unit and generates the position error signal.

BRIEF DESCRIPTION OF THE DRAWINGS

Aspects of the present invention will become more apparent by describing in detail illustrative, non-limiting embodiments thereof with reference to the accompanying drawings, in which.

DETAILED DESCRIPTION OF EXEMPLARY EMBODIMENTS OF THE INVENTION

A hard disc drive (HDD) is constituted of a head disc assembly (HDA), which is comprised of mechanical components, and an electrical circuit.

Figure 1:
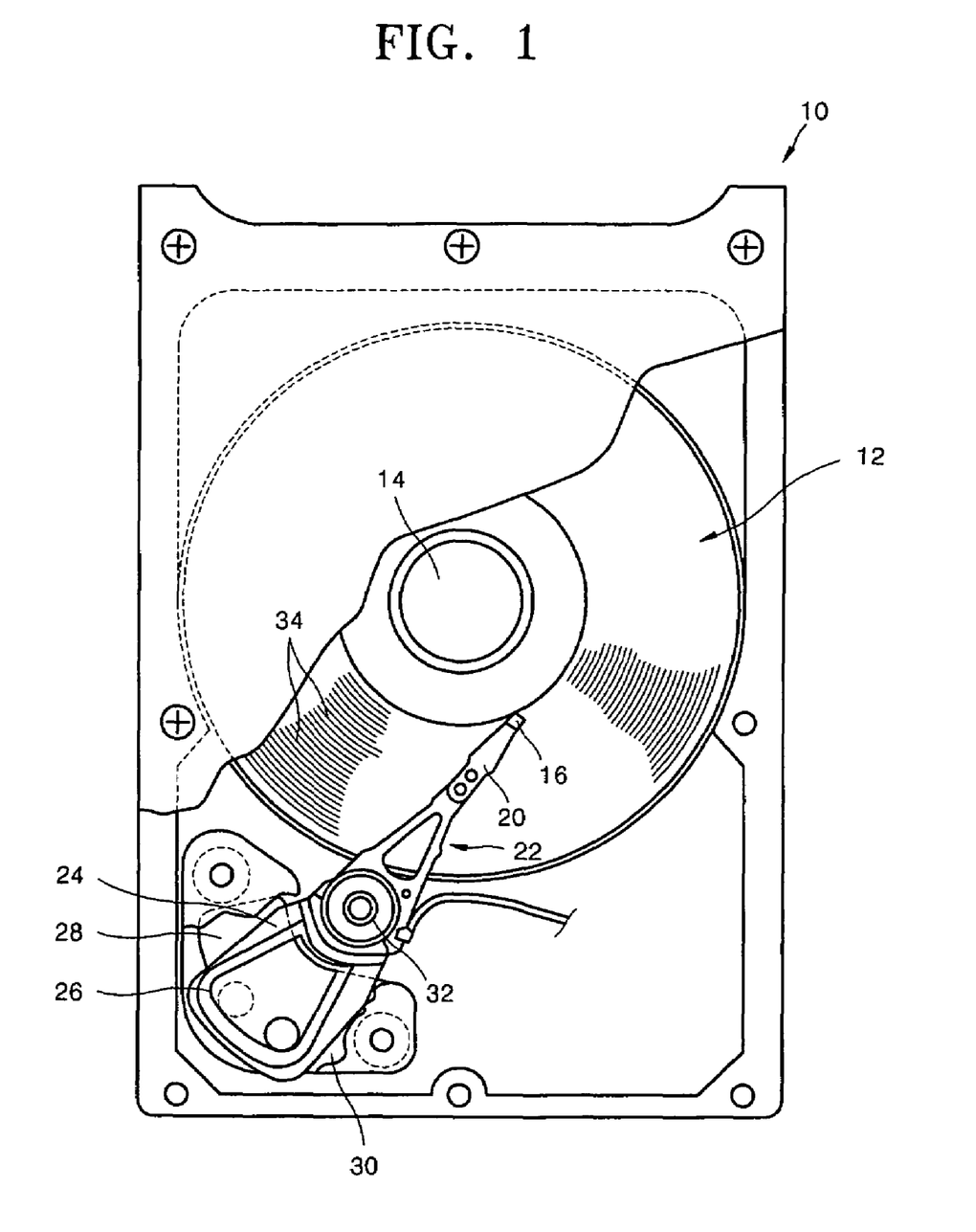
FIG. 1 is a schematic top view of a head disc assembly (HAD) of an HDD to which an embodiment of the present invention is applied.

FIG. 1 is a schematic top view of an HDA 10 of an HDD to which an embodiment of the present invention is applied. Referring to FIG. 1, the HDA 10 includes at least one magnetic disc 12 rotated by a spindle motor 14. The HDA 10 also includes a transducer (not shown) adjacently located on a disc surface.

The transducer can read information from or write information on the rotating disc 12 by sensing a magnetic field formed on the disc 12 or magnetizing the disc 12. Typically, a transducer is associated with each disc surface. Though a single transducer is shown in FIG. 1, the transducer includes a write transducer which magnetizes the disc 12 and a read transducer which senses a magnetic field of the disc 12. The read transducer is composed of a magneto-resistive (MR) component.

The transducer can be incorporated into a head 16. The head 16 generates an air bearing between the transducer and the disc surface. The head 16 is incorporated into a head stack assembly (HSA) 22. The HSA 22 is attached to an actuator arm 24 having a voice coil 26. The voice coil 26 is located adjacent to a magnetic assembly 28 to define a voice coil motor (VCM) 30. A current supplied to the voice coil 26 generates a torque which rotates the actuator arm 24 around a bearing assembly 32. The rotation of the actuator arm 24 moves the transducer across the disc surface.

Information is stored in annular tracks of the disc 12. In general, each track 34 includes a plurality of sectors. Each sector includes a data field and an identification field. The identification field is comprised of a Gray code for identifying a sector and a track (cylinder). The transducer moves across the disc surface in order to read information from or write information on another track.

Figure 2:
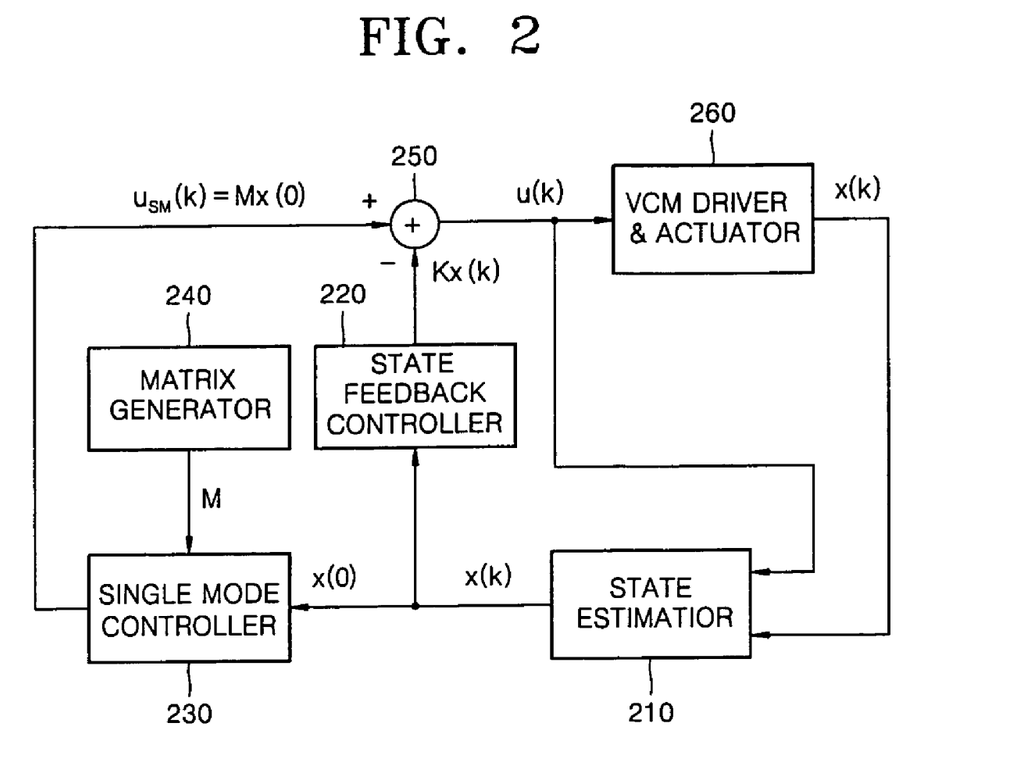
FIG. 2 is a block diagram of an adaptive settling control apparatus in a track seek mode of the HDD according to an embodiment of the present invention.

FIG. 2 is a block diagram of an adaptive settling control apparatus used in a track seek mode of the HDD according to an embodiment of the present invention.

Referring to FIG. 2, the adaptive settling control apparatus includes a state estimator 210, a state feedback controller 220, a single mode controller 230, a matrix generator 240, a summing unit 250, and a voice coil motor (VCM) driver & actuator 260.

The state estimator 210 performs a process for estimating a state variable x(k) value of head motion including head position, velocity, and control input information from a position error signal (PES) using the state equation of Equation 1, shown below.

The state feedback controller 220 generates state feedback control information obtained by multiplying the state variable x(k) value by a state feedback gain K.

The single mode controller 230 performs the calculating process of Equation 17, shown below, for generating initial state compensation information $u_{SM}(k)$ obtained by multiplying a state x(0) value at a time corresponding to the beginning of the settling control mode by a square matrix M for transiting an initial state x(0) of the head motion at the beginning of the settling control mode of the track seek mode onto a system eigen vector line. Here, a system eigen vector indicates the eigen vector according to characteristics of the head stack assembly included in the system (HDD).

The matrix generator 240 generates the square matrix M used for transiting the initial state x(0) of the head motion at the beginning of the settling control mode of the track seek mode onto the system eigen vector line. Effectively, the square matrix M is determined so that the initial state x(0) is transited onto an orthogonal point of the eigen vector. Also, the square matrix M is designed so that values of the square matrix M are stored in read only memory (ROM) (not shown) and used from the ROM.

The summing unit 250 sums the initial state compensation information output from the single mode controller 230 to a negative value of the state feedback control information output from the state feedback controller 220 and outputs the added result to the VCM driver & actuator 260.

The VCM drive & actuator 260 moves a head by generating a driving current corresponding to the output of the summing unit 250 and generates the PES corresponding to the head motion during a track-seek and track-follow operation.

A control process in the settling control mode performed by the single mode controller 230 will now be described in detail.

An entire VCM actuator control process will now be described. A typical VCM actuator control model is shown in Equation 1.

$$x(k+1) = Ax(k) + Bu(k) \quad (1)$$

$$\begin{bmatrix} x(k+1) \\ v(k+1) \\ u(k) \end{bmatrix} = \begin{bmatrix} 1 & T_s & K_a(2T_sT_d - T_d^2)/2 \\ 0 & 1 & K_aT_d \\ 0 & 0 & 0 \end{bmatrix} \begin{bmatrix} x(k) \\ v(k) \\ u(k-1) \end{bmatrix} + \begin{bmatrix} K_a(T_s - T_d)^2/2 \\ K_a(T_s - T_d) \\ 1 \end{bmatrix} u(k)$$

Here, x(k), v(k), and u(k−1) included in the state variable x(k) indicate a head position, velocity, and a previous control input, respectively, and constants $K_a$, $T_s$, and $T_d$ indicate an acceleration constant, a sampling time, and a control delay time, respectively. A settling control process performed by the state feedback controller 220 uses Equation 2.

$$u(k) = -Kx(k) \quad (2)$$

Here, K indicates the state feedback gain. A dynamic equation for the settling control process is represented as Equation 3.

$$x(k+1) = (A-BK)x(k) \quad (3)$$

Therefore, a response of the settling control process is determined by an initial state represented in Equation 4.

$$x(k+1) = (A-BK)^k x(0) \quad (4)$$

Here, the initial state x(0) depends on the seek distance.

Therefore, in order to compensate for the initial state x(0) to be constant regardless of seek distance, a single mode control compensation process is applied to an embodiment of the present invention. That is, a main procedure of the single mode control compensation process is to transit the initial state x(0) onto the system eigen vector line.

A design of a settling control system according to an embodiment of the present invention will now be described.

A response of the settling control system is analyzed with pole points as indicated by Equation 5.

$$x(k) = (A - BK)^k x(0) \tag{5}$$

$$= P \begin{bmatrix} \lambda_1^k & 0 & 0 \\ 0 & \lambda_2^k & 0 \\ 0 & 0 & \lambda_3^k \end{bmatrix} P^{-1} x(0)$$

$$= \lambda_1^k p_1 q_1 x(0) + \lambda_2^k p_2 q_2 x(0) + \lambda_3^k p_3 q_3 x(0)$$

Here, constants $\lambda_1$, $\lambda_2$, and $\lambda_3$ are pole points that correspond to eigen values of a matrix A−BK, and vectors $p_1$, $p_2$, and $p_3$ are eigen vectors. A matrix P is comprised of the eigen vectors $p_1$, $p_2$, and $p_3$, and vectors $q_1$, $q_2$, and $q_3$ are horizontal vectors of $P^{-1}$, which is an inverse matrix of P. Therefore, the eigen vectors $p_1$, $p_2$, and $p_3$ and the horizontal vectors $q_1$, $q_2$, and $q_3$ have vertical or horizontal correlations shown in Equation 6.

$$q_i p_j = \begin{cases} 1, & i = j \\ 0, & i \neq j \end{cases} \tag{6}$$

Three pole points $\lambda_1$, $\lambda_2$, and $\lambda_3$ and the initial state x(0) are related to the response of the settling control system in Equation 5.

If the initial state is on a certain eigen vector line, only a corresponding pole point appears in the response of the settling control system. For example, if the initial state is on a second eigen vector line, that is, if x(0)=$ap_2$ where a is a constant, the second eigen value $\lambda_2$ appears in the response of the settling control system as shown below in Equation 7 according to Equations 5 and 6, and the system state is always on the second eigen vector line and converges into a zero point. A convergence velocity is determined by the second eigen value $\lambda_2$.

$$x(k) = a\lambda_2^k p_2 \tag{7}$$

This concept can be easily understood if a phase plane analysis scheme is used.

Figure 3:
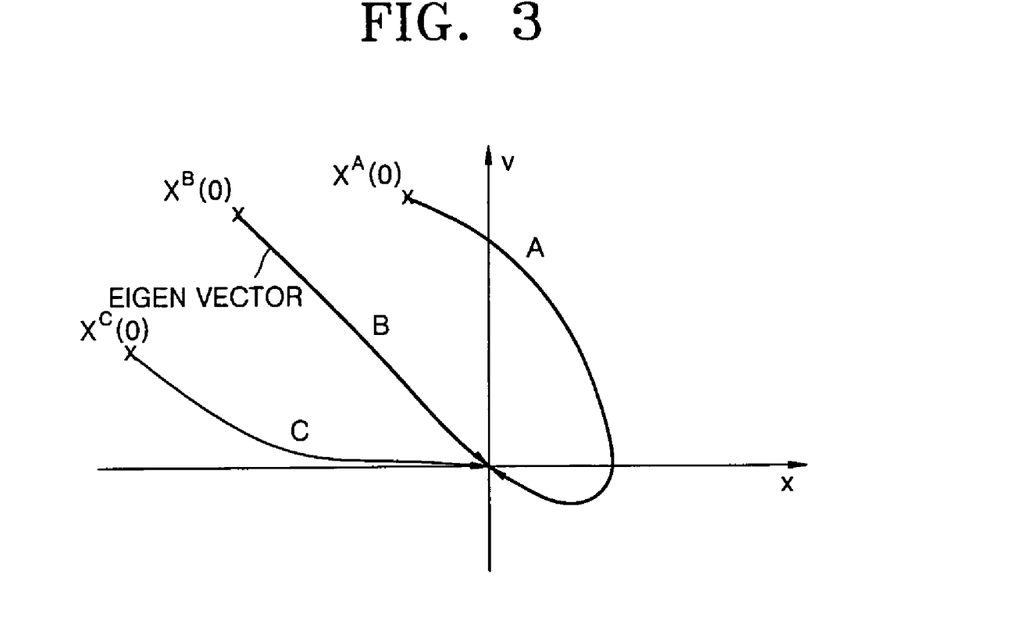
FIG. 3 illustrates examples of a system response trajectory according to an initial state of the head motion at a settling control time for illustrating a single mode control process to which an embodiment of the present invention is applied.

FIG. 3 shows three examples of a system response trajectory according to the initial state. Since the number of orders of a system is 3 as shown in Equation 1, a three dimensional space is originally needed, but a two dimensional plane constituted of position and velocity is used for simplicity of concept transfer. For a high initial velocity (case "A" shown in FIG. 3), the three pole points $\lambda_1$, $\lambda_2$, and $\lambda_3$ appear in the system response. Accordingly, in general, a system state trajectory becomes a curve, and an overshoot is generated. For a low initial velocity (case "C" shown in FIG. 3), three pole points are involved as well. Accordingly, the system state trajectory becomes a curve. In this case, although an overshoot is not generated, the response is slow. For the initial state on the eigen vector line (case "B" shown in FIG. 3), the system state trajectory is an eigen vector direct line that converges into the zero point along with the eigen vector direct line, and therefore, the overshoot can be prevented. In addition, if an eigen value of the eigen vector is very large, the velocity at which the system state converges into the zero point is fast. That is, if the initial state is on an eigen vector line with a high velocity, it can be predicted that the best performance of the settling control system can be obtained.

However, the initial state varies according to the surroundings such as temperature, and in particular, it varies remarkably according to a seek distance. Therefore, in order to obtain a fast and fine settling control performance, it is necessary to additionally use a control input for transiting the initial state onto the eigen vector line.

As described above, since only a single pole point appears in the system response when the system state starts on the eigen vector line, a controller performing this function is called the single mode controller 230 in the present embodiment.

An entire settling controller including the single mode controller 230 is represented by Equation 8.

$$u(k) = -Kx(k) + u_{SM}(k) \tag{8}$$

Here, $u_{SM}(k)$ denotes a single mode control input. In this case, a dynamic equation of the entire system is represented by Equation 9.

$$x(k+1) = (A - BK)x(k) + Bu_{SM}(k) \tag{9}$$

Since the number of orders of the system of Equation 9 is 3 and can be controlled, a control input by which the initial state x(0) can be transited to a predetermined target state $x_{final}$ in 3 samples exists. The control input for 3 samples is defined by Equation 10.

$$U = [u_{SM}(0) \; u_{SM}(1) \; u_{SM}(2)]^T \tag{10}$$

The system target state $x_{final}$ can be represented by Equation 11 in Equation 9.

$$x_{final} = (A-BK)^3 x(0) + (A-BK)^2 B u_{SM}(0) + (A-BK) B u_{SM}(1) + B u_{SM}(2) \tag{11}$$

The system target state $x_{final}$ should satisfy Equation 12 with respect to the constant a in order to exist on the eigen vector line.

$$x_{final} = \alpha p_i \tag{12}$$

By Equations 11 and 12, a single mode control input value by which the initial state x(0) can be transited to the eigen vector line is calculated according to Equation 13.

$$U = [u_s(0) \; u_s(1) \; u_s(2)]^T = Q[x_{final} - Rx(0)] = Q[\alpha p_i - Rx(0)] \tag{13}$$

Here, Q and R are matrices defined by Equation 14.

$$Q = [(A-BK)^2 B \; (A-BK)B \; B]^{-1}, \; R = (A-BK)^3 \tag{14}$$

Figure 4:
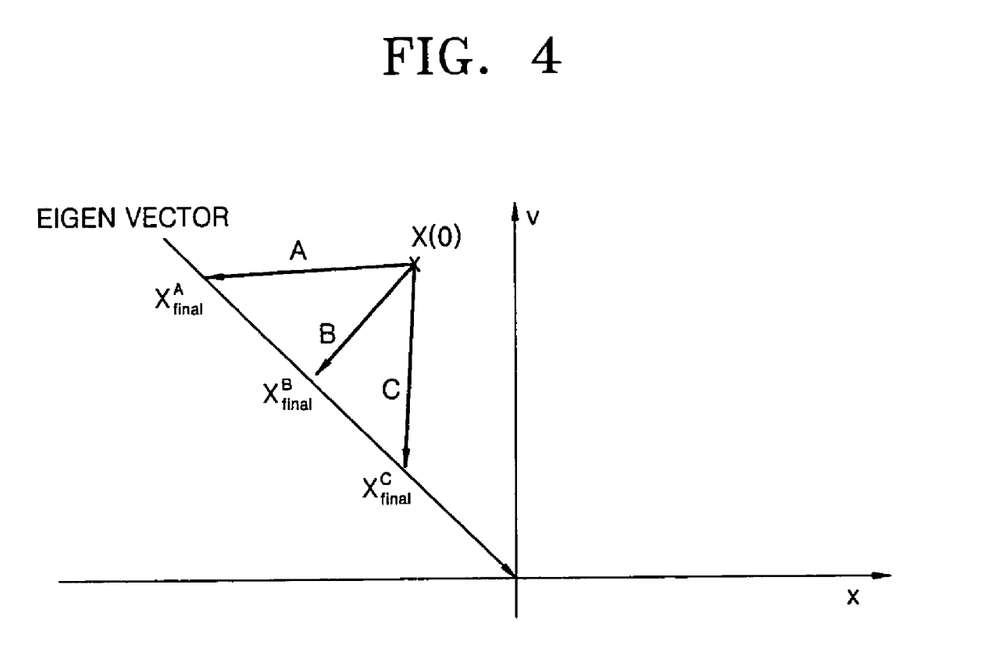
FIG. 4 illustrates examples in which the initial state of the head motion according to an embodiment of the present invention is transited to a target state of an eigen vector.

What remains is to determine a unique target state, i.e., to determine the constant a in Equation 12. In the present embodiment, the target state is determined so that the single mode control input is minimized. FIG. 4 illustrates three examples in which the initial state is transited to the target state. In a case where the target state is nearest to the initial state (case "B" shown in FIG. 4), the control input required for the state transition is minimized. A cost function required for the minimization is defined by the magnitude of the control input as shown in Equation 15. In cases A and C, because the initial state is not transited onto the orthogonal position of the eigen vector line, the target state is not nearest to the initial state. Accordingly, in these cases, the control input required for the state transition is not minimized.

$$J(\alpha) = U^T U = [\alpha p_i - Rx(0)]^T Q^T Q [\alpha p_i - Rx(0)] \tag{15}$$

A value of the constant a for minimizing Equation 15 is represented by Equation 16.

$$a^* = \frac{p_i^T Q^T QR}{p_i^T Q^T Qp_i} x(0) \qquad (16)$$

A single mode control input optimized by Equations 12 and 16 is determined by Equation 17.

$$U^* = [u_{SM}^*(0) \quad u_{SM}^*(1) \quad u_{SM}^*(2)] = \left(\frac{Qp_i p_i^T Q^T QR}{p_i^T Q^T Qp_i} - QR\right) x(0) \qquad (17)$$
$$= Mx(0)$$

The square matrix M represented in Equation 17 is pre-calculated and stored in the ROM of the matrix generator 240. In brief, the initial state x(0) is obtained by the state estimator 210 at the beginning of the settling control mode and multiplied by the square matrix M, and thus single mode control inputs for 3 samples $u^*_{SM}(0)$, $u^*_{SM}(1)$, and $u^*_{SM}(2)$ are determined. By sequentially inputting these three input values to the system, the initial state is transited onto the orthogonal position of the eigen vector.

Experimental results illustrating improvement of the settling control performance when the single mode controller 230 consistent with the present embodiment is used are discussed next.

Figure 5:
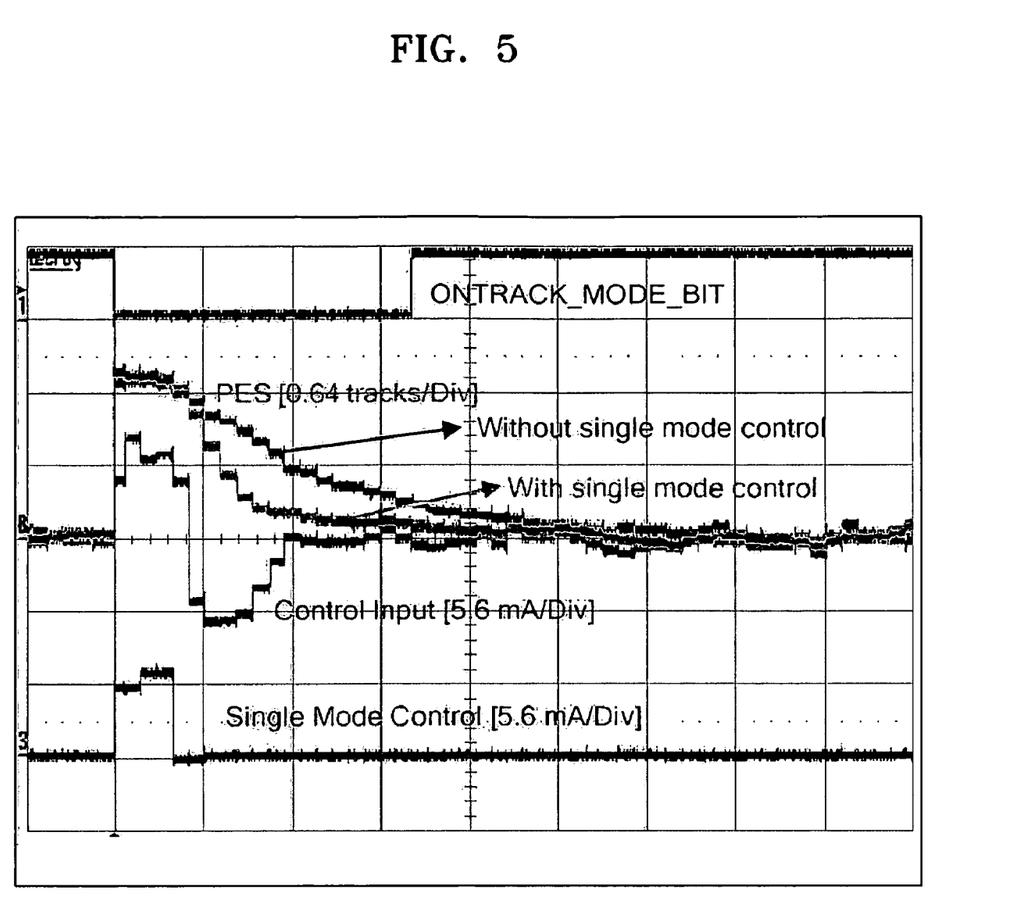
FIG. 5 is a diagram illustrating a comparison of settling control performances when single mode control is used and when it is not used, when one track is sought.
Figure 6:
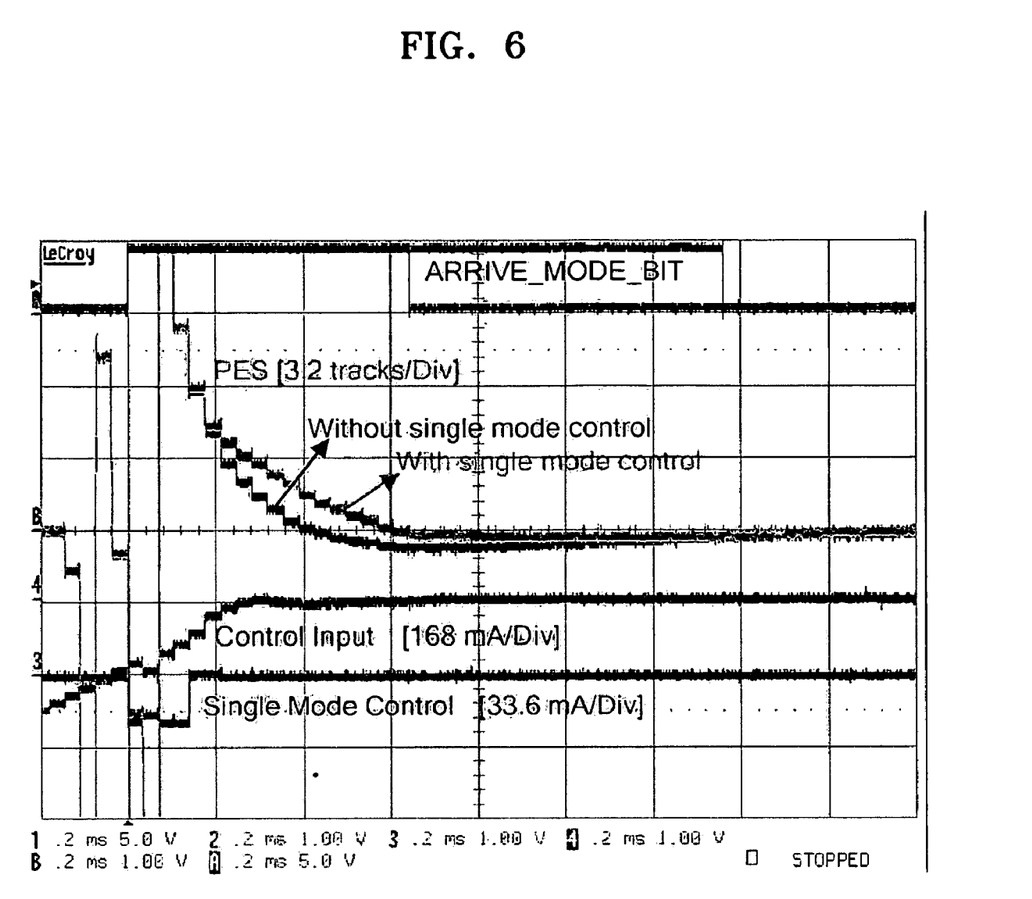
FIG. 6 is a diagram illustrating a comparison of settling control performances when single mode control is used and when it is not used, when 7,000 tracks are sought.
Figure 7:
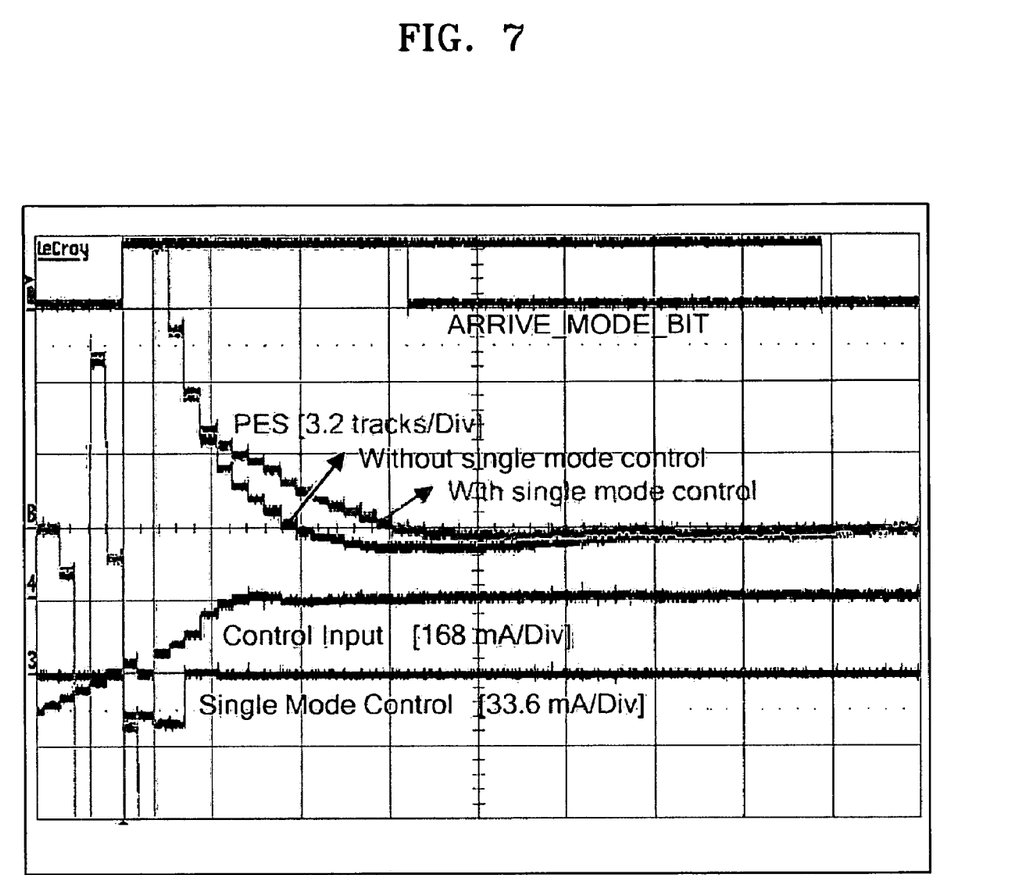
FIG. 7 is a diagram illustrating a comparison of settling control performances when single mode control is used and when it is not used, when 40,000 tracks are sought.

An HDD of which track density, a track width, and a disc rotation speed are 130,000 TPI, 0.19 µm, and 7,200 rpm, respectively, is used for the experiment. A system response for a one track seek is illustrated in FIG. 5. For the one track seek, the settling control mode begins without the acceleration/deceleration mode. In this case, an initial velocity is almost 0, corresponding to the case "C" of FIG. 3. According to FIG. 5, if the single mode controller 230 is not used, the system response is slow, and the time for seeking one track is longer. On the contrary, if the single mode controller 230 is used, the system response is quick, and the seeking time can be reduced by around 0.4 msec. Performance comparison results for a track seek distance of 7,000 tracks are illustrated in FIG. 6. In this case, the initial velocity is high by the acceleration/deceleration mode, corresponding to the case "A" of FIG. 3. If the single mode controller 230 is not used, an overshoot is generated, and a settling time is longer. On the contrary, if the single mode controller 230 is used, the overshoot is suppressed, and the settling time can be reduced by around 0.6 msec. Performance comparison results for the track seek distance of 40,000 tracks are illustrated in FIG. 7. In this case, the initial velocity is also high by the acceleration/deceleration mode, corresponding to the case "A" of FIG. 3. If the single mode controller 230 is used, the settling time can be reduced by around 0.8 msec.

As described above, according to embodiments of the present invention, by controlling an initial state from which a settling control mode begins to be transited onto the eigen vector line of a system and converges into the zero point along with the eigen vector line in a track seek control, an improved and even settling control can be performed regardless of a seek distance, and in particular, the track seek time can be reduced.

The present invention can be realized as a method, an apparatus, and/or a system. When the present invention is realized as software, components of the present invention are embodied as code segments for executing required operations. A program or the code segments can be stored in a processor readable recording medium and transmitted as computer data signals combined with a carrier using a transmission medium or a communication network. The processor readable recording medium can be any data storage device that can store or transmit data which can be thereafter be read by a computer system. Examples of the processor readable recording medium include electronic circuits, semiconductor memory devices, read-only memory (ROM), flash memory, erasable ROM, floppy disks, optical discs, hard discs, optical fiber media, and RF networks. The computer data signals include any signal which can be propagated via transmission media such as electronic network channels, optical fibers, air, electronic fields, RF networks.

While this invention has been particularly shown and described with reference to preferred embodiments thereof, it will be understood by those skilled in the art that various changes in form and details may be made therein without departing from the spirit and scope of the invention as defined by the appended claims. The above-described embodiments should be considered in a descriptive sense only and are not for purposes of limitation. Therefore, the scope of the invention is defined not by the detailed description of the exemplary embodiments of the invention but by the appended claims, and all differences within the scope will be construed as being included within the scope of the present invention.

What is claimed is:

1. An adaptive settling control method in a track seek mode of a disc drive for use in controlling the track seek mode of the disc drive, the method comprising:
controlling a head to converge to a target position and a target velocity along an eigen vector by transiting an initial state of head motion onto a system eigen vector line corresponding to the eigen vector at the time of transiting from an acceleration/deceleration control mode of the track seek mode to a settling control mode.

2. The method of claim 1, wherein the eigen vector depends on characteristics of a head stack assembly included in the disc drive.

3. The method of claim 1, wherein the initial state is transited onto the eigen vector line by multiplying variable values of the initial state by a predetermined square matrix.

4. The method of claim 1, wherein the initial state is transited onto the orthogonal position of the eigen vector line by multiplying variable values of the initial state by a predetermined square matrix.

5. The method of claim 4, wherein the square matrix M is defined as $$M = \frac{Qp_i p_i^T Q^T QR}{p_i^T Q^T Qp_i} - QR$$

wherein $Q=[(A-BK)^2 B(A-BK) B B]^{-1}$, $R=(A-BK)^3$ wherein K indicates a state feedback gain, $$A = \begin{bmatrix} 1 & T_s & K_a(2T_sT_d - T_d^2)/2 \\ 0 & 1 & K_aT_d \\ 0 & 0 & 0 \end{bmatrix}$$

-continued $$B = \begin{bmatrix} K_a(T_s - T_d)^2/2 \\ K_a(T_s - T_d) \\ 1 \end{bmatrix}$$

constants $K_a$, $T_s$, and $T_d$ indicate an acceleration constant, a sampling time, and a control delay time, respectively, and $p_i$ is the eigen vector, and i is an index.

6. An adaptive settling control apparatus for use in a track seek mode of a disc drive in a track seek control apparatus of the disc drive, the apparatus comprising:
- a state estimator configured to estimate a state information value including head position, velocity, and control input information from a position error signal;
- a state feedback controller configured to generate state feedback control information obtained by multiplying the state information value by a predetermined state feedback gain;
- a single mode control circuit configured to generate initial state compensation information obtained by multiplying a state information initial value at a time at a beginning of a settling control mode by a predetermined square matrix for transiting an initial state of head motion at the beginning of the settling control mode onto a system eigen vector line;
- a summing unit adding the initial state compensation information to a negative value of the state feedback control information; and
- a voice coil motor (VCM) driver & actuator moving a head by generating a driving current corresponding to an output of the summing unit and generating the position error signal.

7. The apparatus of claim 6, wherein the single mode control circuit comprises:
- a matrix generator configured to generate the predetermined square matrix at the beginning of the settling control mode; and
- a single mode controller generating initial state compensation information obtained by multiplying the state information initial value at the beginning of the settling control mode by the predetermined square matrix.

8. The apparatus of claim 6, wherein the predetermined square matrix is determined so that the state information initial value is transited onto the orthogonal position of the eigen vector line.

9. The apparatus of claim 6, wherein the predetermined square matrix M is defined as $$M = \frac{Qp_i p_i^T Q^T QR}{p_i^T Q^T Q p_i} - QR$$

wherein $Q = [(A-BK)^2 B \ (A-BK)B \ B]^{-1}$, $R = (A-BK)^3$ wherein K indicates a state feedback gain, $$A = \begin{bmatrix} 1 & T_s & K_a(2T_sT_d - T_d^2)/2 \\ 0 & 1 & K_aT_d \\ 0 & 0 & 0 \end{bmatrix}$$

$$B = \begin{bmatrix} K_a(T_s - T_d)^2/2 \\ K_a(T_s - T_d) \\ 1 \end{bmatrix}$$

constants $K_a$, $T_s$, and $T_d$ indicate an acceleration constant, a sampling time, and a control delay time, respectively, and $p_i$ is the eigen vector, and i is an index.

* * * * *